United States Patent [19]

Vaughn

[11] 4,302,563
[45] Nov. 24, 1981

[54] REACTIVE CYCLOBUTANONE-CONTAINING POLYMERS AND METHOD FOR PREPARING SAME

[75] Inventor: Walter L. Vaughn, Lake Jackson, Tex.

[73] Assignee: The Dow Chemical Company, Midland, Mich.

[21] Appl. No.: 137,087

[22] Filed: Apr. 3, 1980

[51] Int. Cl.³ .............................................. C08C 2/00
[52] U.S. Cl. .................................. 525/330; 525/333; 525/334; 528/220; 528/222; 528/271
[58] Field of Search ....................... 525/330, 333, 334; 528/220, 222, 271

[56] References Cited

U.S. PATENT DOCUMENTS

| | | | |
|---|---|---|---|
| 2,515,307 | 7/1950 | Lewis et al. | 260/761 |
| 2,962,485 | 11/1960 | Walter et al. | 260/93.4 |
| 3,250,752 | 5/1966 | Walter | 260/80 |
| 3,631,157 | 12/1971 | Vaughn | 260/78.5 |

OTHER PUBLICATIONS

Naylor, *J. Chem. Soc.*, 1945, pp. 244–245.
Holder, *J. Chem. Ed.*, 53(2), 1976, pp. 81–85.

*Primary Examiner*—Maurice J. Welsh
*Attorney, Agent, or Firm*—W. J. Lee

[57] ABSTRACT

Synthetic polymers containing at least one cyclobutanone group of the formula

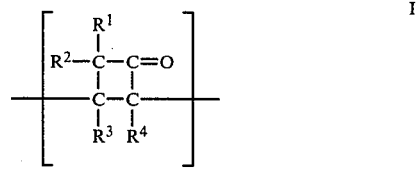

wherein $R^1$ to $R^4$ are selected from the class consisting of alkyl, aryl, halogen, and hydrogen radicals are prepared by reacting in an inert organic solvent a conjugated diene polymer having unsaturated bonds in the main or side chain with a ketone of the formula

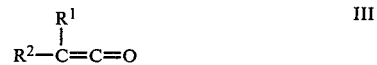

Such polymers are useful as adhesives and flexibilizers, and they can be readily cross-linked to form elastomeric coatings with good solvent resistance.

11 Claims, No Drawings

REACTIVE CYCLOBUTANONE-CONTAINING POLYMERS AND METHOD FOR PREPARING SAME

BACKGROUND OF THE INVENTION

The present invention relates to synthetic polymers. More specifically, it relates to synthetic polymers possessing at least one cyclobutanone group in their structure and to a process for obtaining such polymers by modifying a conjugated diene polymer.

Conjugated diene polymers, which term includes the homopolymers and copolymers of conjugated diene monomers as well as interpolymers of such monomers with other polymerizable monomers, are well known in the art, as are the methods for their preparation. Also known are methods for modifying such polymers to broaden the available range of properties and uses by reacting them with other organic compounds.

It is an object of the present invention to provide a novel method for modifying such conjugated diene polymers so as to obtain reactive synthetic polymers which cannot be obtained by direct polymerization of monomers and which can also serve as chemical intermediates for other valuable polymers in addition to having significant utility in themselves.

SUMMARY OF THE INVENTION

In one aspect, the present invention provides a new composition of matter comprising a synthetic polymer containing at least one cyclobutanone group of the formula

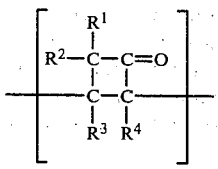

wherein $R^1$ to $R^4$ are selected from the class consisting of alkyl, aryl, halogen, and hydrogen radicals. The compositions of $R^1$ to $R^4$ are the same as those of the beginning molecules shown below in II and III. In another aspect, the present invention provides a process for preparing such a polymer which comprises reacting, in an inert organic solvent, at a temperature less than 100° C., a conjugated diene polymer having at least one unsaturated bond in the main or side chain embodied by a group of the formula

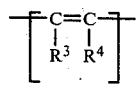

with a ketene of the formula

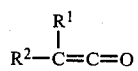

where $R^1$ to $R^4$ are as described above.

The polymers of this invention are highly adhesive and have good solubility in solvents such as acetone, methyl ethyl ketone, and the like. Such polymers can also be cross-linked to form insoluble and tenacious films and coatings. Additionally, the polymers of the present invention are highly reactive due to the carbonyl moiety of the cyclobutanone group and, therefore, they can serve as chemical precursors for other valuable polymers.

DETAILED DESCRIPTION OF THE INVENTION

The precursor conjugated diene polymers utilized in this invention are known in the art and are prepared by known methods so as to obtain polymeric structures having at least one unsaturated bond in the main or side chain embodied by the group of Formula II. Such a group can have either a cis or trans configuration; the cis configuration, however, appears to be more reactive. Suitable monomers used to prepare these conjugated diene polymers are well known in the art and include such compounds as 1,3-butadiene, isoprene, chloroprene, 2-phenyl-1,3-butadiene, 1,3-pentadiene, and the like, polymerized alone or in combination with minor amounts of other monomers including vinyl aromatic compounds such as styrene, α-methylstyrene, and the like; vinylcyano compounds such as acrylonitrile, methacrylonitrile, and the like; unsaturated acids and esters such as acrylic acid, methacrylic acid, ethyl acrylate, and the like; alkenes such as ethylene, propylene, butene, cyclohexene, and the like; and the halogenated derivatives of the above.

Such precursor conjugated diene polymers can be reacted with a ketene to obtain the cyclobutanone-containing synthetic polymers of the present invention. Suitable ketenes are represented by Formula III, wherein $R^1$ and $R^2$ are, independently, alkyl, aryl, halogen, or hydrogen radicals. Preferably, the group (moiety)

contains no more than about 20 total carbon atoms. Suitable ketenes, then, include ketene, dimethyl ketene, chloro- or bromomethyl ketene, diethyl ketene, phenoxymethyl ketene, diphenyl ketene, and the like. Such ketenes are well known in the art, as are the methods for their preparation. Conventional methods include dehydrohalogenation of an acyl halide, dehalogenation of an α-haloacyl halide, and pyrolysis of an anhydride or ketene dimer. The simplest ketene $CH_2=C=O$, is made by the pyrolysis of acetone.

The beginning unsaturated moiety of Formula II may have, e.g., the following values of $R^3$ and $R^4$:

| Polymerized Diene Monomer | $R^3$ | $R^4$ |
|---|---|---|
| 1,3-butadiene | hydro | hydro |
| isoprene | hydro | methyl |
| chloroprene | hydro | chloro |
| 2-phenyl-1,3-butadiene | phenyl | hydro |
| 1,3-pentadiene | hydro | hydro |
| 2-chloro-1,3-pentadiene | hydro | chloro |

The beginning ketene of formula III may have, e.g., the following values of $R^1$ and $R^2$:

| Ketene | $R^1$ | $R^2$ |
|---|---|---|
| Ketene | hydro | hydro |
| methyl, bromo-ketene | methyl | bromo |

-continued

| Ketene | R¹ | R² |
| --- | --- | --- |
| methyl, chloro-ketene | methyl | chloro |
| phenoxy, methyl-ketene | methyl | phenoxy |
| diethyl ketene | ethyl | ethyl |
| chloroketene | chloro | hydro |
| dichloroketene | chloro | chloro |
| chloroethyl ketene | chloro | ethyl |
| diphenyl ketene | phenyl | phenyl |
| aldo ketenes | alkyl | hydro |
| keto ketenes | alkyl | alkyl |

The reaction between the ketene and the precursor conjugated diene polymer is carried out in a suitable inert organic solvent such as benzene, toluene, xylene, 1,1,1-trichloroethane, perchloroethylene, ethylene dichloride, methylene chloride, o-dichlorobenzene, and the like. It is essential that the solvent be less reactive than the precursor conjugated diene polymer used, e.g., the solvent should not contain reactive hydrogens or unsaturated carbon-carbon bonds. Additionally, the solvent should not contain water, alcohol, or other hydroxyl-containing compounds. To avoid a highly viscous reaction mixture, it is advantageous that the concentration of the conjugated diene polymer in the solvent be less than about 10 percent by weight, and preferably between about 2 to 5 percent by weight.

A suitable method for effecting the reaction according to this invention consists of forming a solution of an acyl halide, having a structure corresponding to the ketene desired, i.e.,

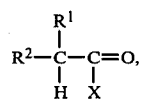

IV wherein X is a halogen such as chlorine or bromine, and a conjugated diene polymer in an inert organic solvent and slowly adding thereto a tertiary amine, such as triethylamine. The reaction between these compounds is exothermic, so care should be taken to avoid the chance of a run-away reaction. The reaction should be run at a temperature less than 100° C. and preferably between about 10° to 30° C. These lower temperatures reduce ketene dimerizations and other side reactions. Atmospheric or superatmospheric pressure is desirable.

Diphenyl ketene, a ketene common to the art can be prepared by dehydrochlorinaton of diphenylacetyl chloride with a tertiary amine in dry ether or THF. The solution can be stored at ambient temperatures for several hours and mixed with other solutions containing the polybutadiene, polyisoprenes, etc. to obtain the desired cycloaddition product. The following ketenes can be made and stored for awhile, preferably under refrigeration: ethyl butyl ketene, diethyl ketene, dibenzyl ketene, dimethyl ketene, dibutyl ketene, and ethylphenyl ketene.

Ketene can be prepared by cracking acetone, acetic acid, acetic anhydride, or di-ketene and immediately passing the so-formed ketene directly into contact with the conjugated diene polymer.

The number of cyclobutanone groups (having the structure of Formula I) contained in the resulting polymer can be controlled by adjusting the molar proportion of the reactants. A molar excess of ketene is generally required to completely saturate the precursor conjugated diene polymer. In some instances, e.g., when a subsequent cross-linking reaction is contemplated, it is desirable to retain some unsaturation in the resulting polymer structure. It will be apparent that if the precursor polymer contains reactive moieties other than the unsaturated bonds contributed by the conjugated diene monomers, reactive groups in addition to the cyclobutanone groups will be formed in the resulting polymer due to competing reactions with the ketene. For example, if the precursor polymer contains acidic moieties imparted by a copolymerized unsaturated carboxylic acid, such acidic moieties will react with the ketene to form an acid anhydride group in the resulting polymer. This reaction is more fully described in U.S. Pat. No. 3,631,157. Consideration must therefore be given to such competing reactions when calculating the molar amount of ketene to be used in obtaining the cyclobutanone groups of the present invention.

The structure of the resulting cyclobutanone group and, accordingly, the properties of the resulting synthetic polymer will depend upon the particular ketene and precursor conjugated diene polymer utilized in the reaction. Generally, the resulting synthetic polymers are characterized as being highly adhesive and soluble in acetone, methyl ethyl ketone, and the like solvents. Such solubility renders these polymers eminently suitable for forming films and coatings by casting according to conventional processes. Additionally, resulting polymers containing residual unsaturation are suitably cross-linked in a conventional manner, e.g., by a brief thermal cure at about 85°–110° C. for about 5–15 minutes to form insoluble and tenacious films and coatings. The synthetic polymers of this invention have further utility as a flexibilizer for other resin compositions, such as an epoxy polymer or polystyrene, to improve shatter resistance. The present polymers have still further utility as chemical intermediates for other valuable compounds due to the characteristic reactivity of the carbonyl moiety in the cyclobutanone group.

Compounds of Formula I above can be crosslinked to obtain

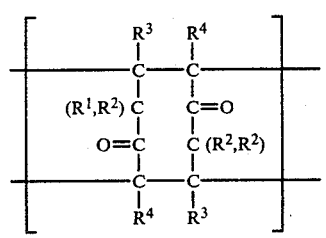

V which are tough, rubbery, insoluble products.

The following specific examples illustrate the invention but are not to be taken as limiting its scope. Parts and percentages are by weight unless otherwise indicated or required by context.

EXAMPLE 1

A 3.36 percent solution of polybutadiene (unsaturation is 92% cis, 5% trans, 2% vinyl; molecular weight is 405,582 weight average/136,619 number average) in benzene is prepared. A 54 g portion of this solution is mixed with 30.8 g (0.0356 mole) of 2-bromopropionyl bromide and placed in a 200 ml glass reactor. To this mixture, 5 ml (0.056 mole) of triethylamine is added dropwise over a 30 minute period. Upon addition of triethylamine, the mixture immediately shows a redbrown color (indicating the presence of a ketene) which fades as the reaction progresses and the so-formed methyl bromo ketene reacts with the polymer unsaturated groups. After the mixture has reacted for 1 hour at 23° C., the product, a white rubbery solid, is precipitated in methanol, washed, and dried. The presence of a cyclobutanone group in the resulting polymer structure is confirmed by infrared spectroscopy. Residual unsaturation is also observed and confirmed by NMR.

The product, as a 10% solution in methyl ethyl ketone, is cast as a film on a glass substrate, a metal substrate, a paper substrate, and a polyethylene substrate, and is found upon evaporation of the solvent to be well adhered to the substrates. Furthermore, baking of the so-cast coatings in an oven at about 100° C. for about 15 minutes causes crosslinking and the tenaciously adhered coating is tough and is found to resist methyl ethyl ketone at ambient temperature.

In a similar manner, other ketenes are prepared in situ by dehydrohalogenation of acyl halide having a structure corresponding to the ketene desired, and the ketenes are reacted with polybutadiene, polyisoprene, and polychloroprene to obtain synthetic polymers containing cyclobutanone groups. The various ketenes used are chloromethyl ketene, bromomethyl ketene, and phenoxymethyl ketene.

I claim:

1. A synthetic polymer containing at least one cyclobutanone group of the formula

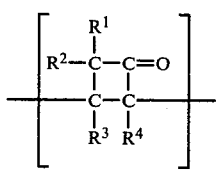

wherein $R^1$, $R^2$, $R^3$, and $R^4$ are selected from the class consisting of alkyl, aryl, halogen, and hydrogen radicals.

2. A process for preparing the synthetic polymer of claim 1 which comprises reacting in an inert organic solvent, at a temperature less than 100° C., a conjugated diene polymer having at least one group of the formula

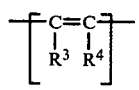

with a ketene of the formula

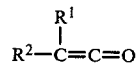

wherein, in the above formulas, $R^1$, $R^2$, $R^3$, and $R^4$ are selected from the class consisting of alkyl, aryl, halogen, and hydrogen radicals.

3. The process according to claim 2 wherein the conjugated diene polymer is selected from the group consisting of polypentadiene, polybutadiene, polychloroprene, and polyisoprene.

4. The process according to claim 2 wherein the temperature is in the range from about 10° to about 30° C.

5. The process according to claim 2 wherein the conjugated diene polymer has a concentration in the inert organic solvent of less than 10 weight percent.

6. The process according to claim 5 wherein the conjugated diene polymer has a concentration in the inert organic solvent of from about 2 to about 5 weight percent.

7. The process according to claim 2 wherein the ketene is selected from the group consisting of ketene, bromomethyl ketene, chloromethyl ketene, phenoxymethyl ketene, and diethyl ketene.

8. The process according to claim 7 wherein the ketene is prepared in situ by dehydrohalogenating a corresponding acyl halide.

9. The polymer of claim 1 when crosslinked to produce a polymer having at least one group of the formula

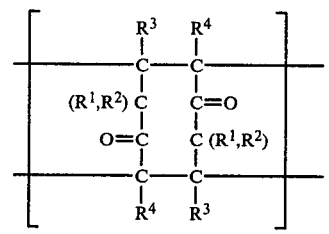

wherein $R^1$, $R^2$, $R^3$, and $R^4$ are selected from the class consisting of alkyl, aryl, halogen, and hydrogen radicals.

10. The polymer of claim 1 when adhered to a substrate.

11. The crosslinked polymer of claim 9 when adhered to a substrate.

* * * * *

UNITED STATES PATENT AND TRADEMARK OFFICE
CERTIFICATE OF CORRECTION

PATENT NO. : 4,302,563
DATED : November 24, 1981
INVENTOR(S) : Walter L. Vaughn

It is certified that error appears in the above—identified patent and that said Letters Patent is hereby corrected as shown below:

In the Abstract, just before Formula III, correct the word "ketone" to --ketene--.

In Col. 4, about line 48, in Formula V, correct "$C(R^2,R^2)$" to --$C(R^1,R^2)$--.

Col. 6, Claim 9, line 45, correct "wherein" to --where--.

Signed and Sealed this

Thirtieth Day of March 1982

[SEAL]

Attest:

GERALD J. MOSSINGHOFF
*Attesting Officer*     *Commissioner of Patents and Trademarks*